Patented Oct. 31, 1922.

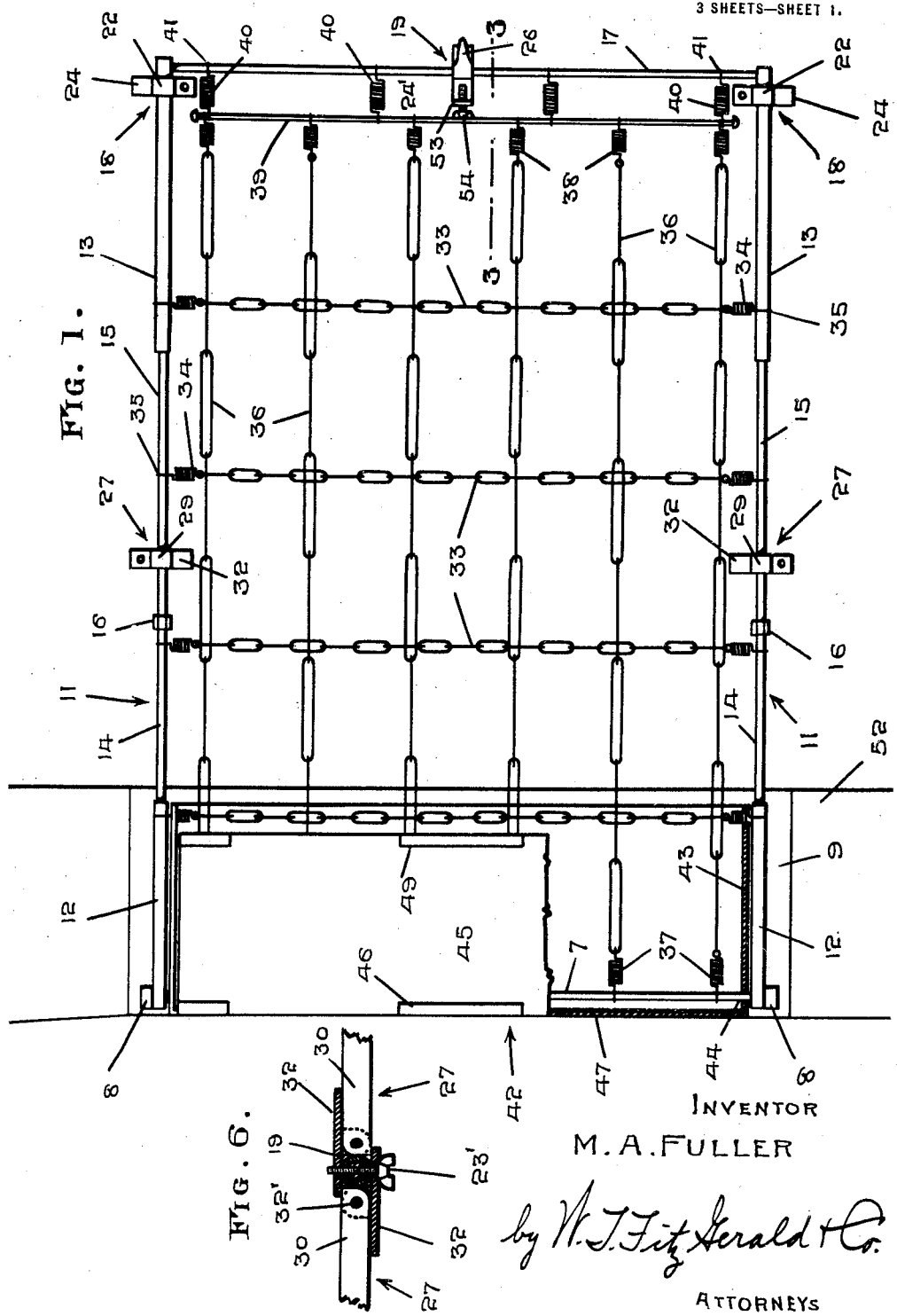

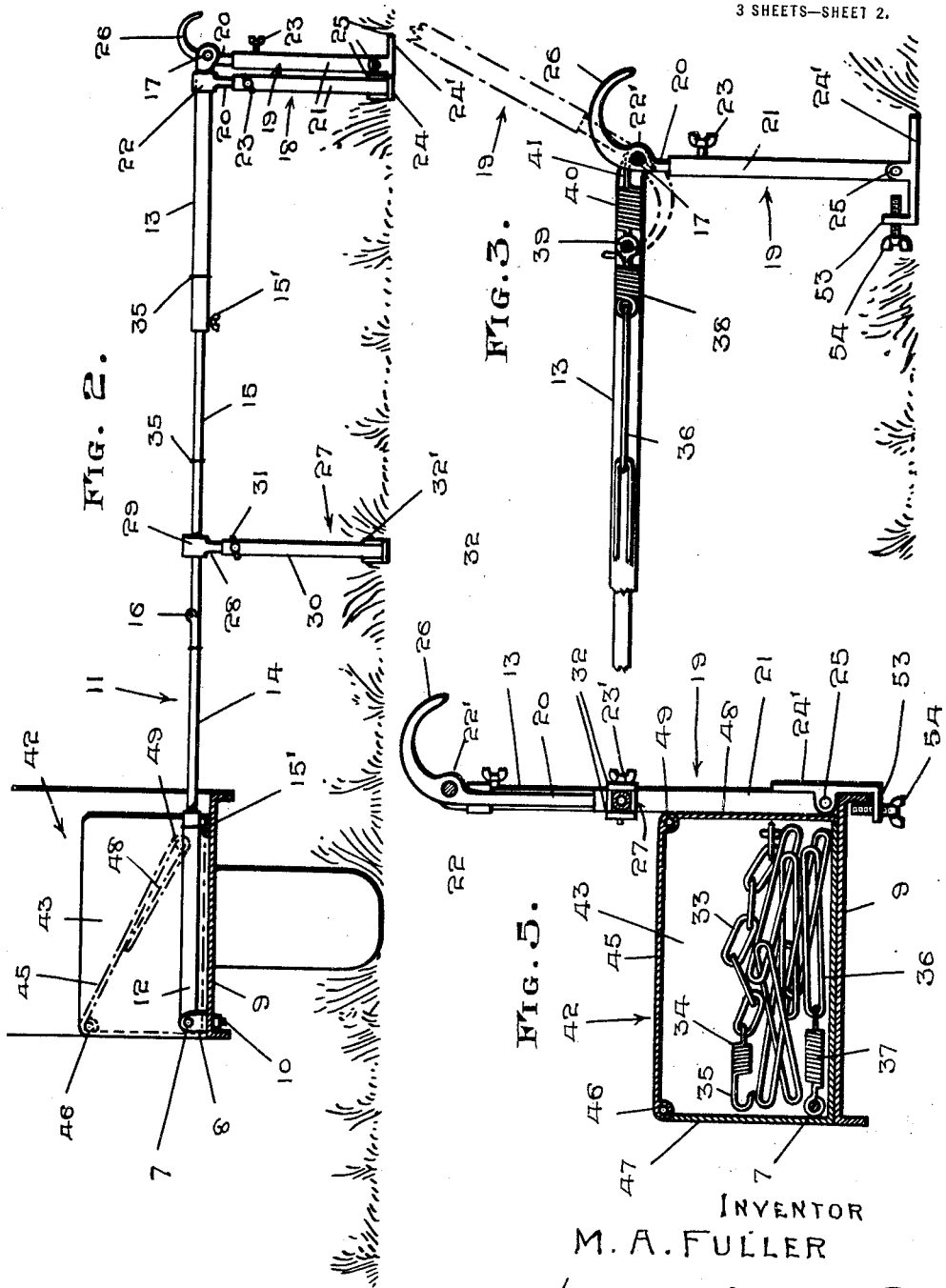

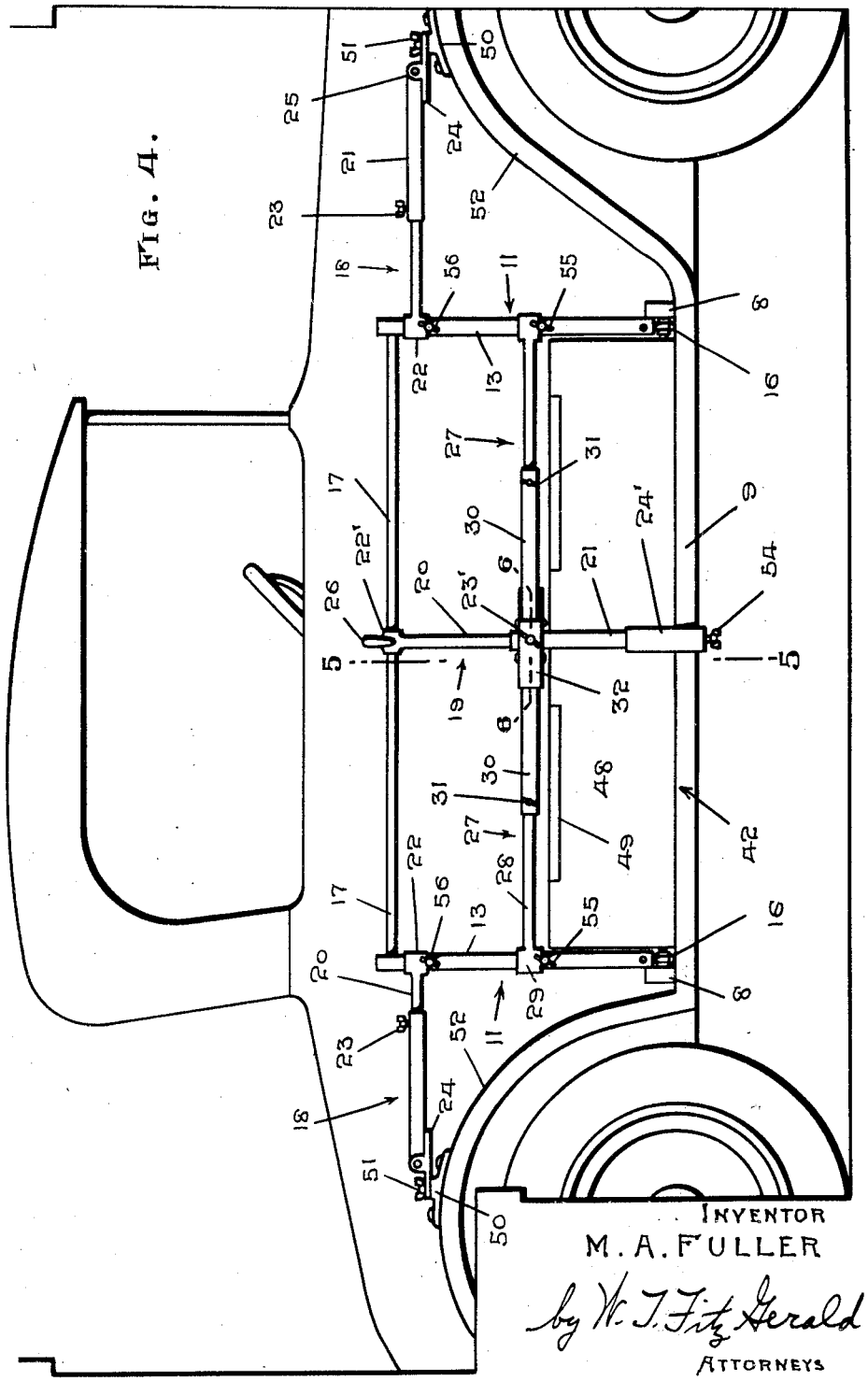

1,433,610

UNITED STATES PATENT OFFICE.

MARY A. FULLER, OF PUEBLO, COLORADO.

AUTOMOBILE TOURIST BED.

Application filed August 16, 1921. Serial No. 492,714.

*To all whom it may concern:*

Be it known that I, MARY A. FULLER, a citizen of the United States, residing at Pueblo, in the county of Pueblo and State of Colorado, have invented certain new and useful Improvements in Automobile Tourist Beds; and I do hereby declare the following to be a full, clear, and exact description of the invention, such as will enable others skilled in the art to which it appertains to make and use the same.

The present invention relates to folding beds adapted especially for use on automobiles or other vehicles, and aims to provide a novel and improved device of that character to be carried by an automobile or other vehicle in a compact arrangement and of such construction that it can be unfolded to provide a convenient and comfortable bed, the device being intended particularly for use by tourists for sleeping accommodations.

Another object is the provision of a novel folding or collapsible bed structure, which can be folded within small encompass when not in use and which can be readily unfolded for use.

A further object is the provision of a bed to be attached to one side of an automobile or other vehicle, and which, when not in use, can be folded in such a manner as to form a luggage carrier, for conveniently holding travelling bags, suitcases and other luggage while travelling.

It is also an object of the invention to provide such a device which is comparatively simple and inexpensive in construction, as well as being practical, convenient and serviceable in use.

With the foregoing and other objects in view, which will be understood as the description proceeds, the invention resides in the construction and arrangement of parts, as hereinafter described and claimed, it being understood that changes can be made within the scope of what is claimed without departing from the spirit of the invention.

The invention is illustrated in the accompanying drawings, wherein:—

Figure 1 is a plan view of the bed unfolded and ready for use.

Fig. 2 is a side elevation thereof, showing the running board in cross section.

Fig. 3 is an enlarged sectional view taken on the line 3—3 of Fig. 1, showing the intermediate end leg in another position in dotted lines.

Fig. 4 is a side elevation of an automobile showing the bed folded up and forming a luggage carrier.

Fig. 5 is an enlarged vertical section on the line 5—5 of Fig. 4.

Fig. 6 is a sectional detail on the line 6—6 of Fig. 4.

In carrying out the invention the bed frame includes a tranverse end rod 7 at the head or inner end of the bed, which has its terminals engaged within clamps 8 to be secured to a support. As shown, the clamps 8 are fitted over the rod 7 at the inner edge of the running board 9 at one side of a motor vehicle, and said clamps have clamping bolts 10 for securing them in place to the running board, and affording convenient means for the ready attachment of the device to and detachment thereof from the vehicle. The frame also includes longitudinal side rails 11 which are of telescopic and hinged construction, and each rail includes the inner tubular member or section 12, an outer tubular member or section 13, and rods or sections 14 and 15 hinged together at their adjacent ends, as at 16, and slidable at their opposite ends in the respective sections 12 and 13. The sections 12 and 14 and also the sections 13 and 15 of the rails can thus be slid or telescoped together, to shorten the bed frame, in collapsing the structure, and the hinged connections 16 between the two telescopic portions will permit the outer portion consisting of the sections 13 and 15 to swing upwardly. The bed frame has a transverse end rod 19 at the outer end or foot of the bed which is engaged by the outer end members or sections 13 of the side rails 11.

The outer end of the frame is supported by corner and intermediate legs 18 and 19, respectively, each of which includes an upper rod or section 20 and a lower tubular section 21 slidably receiving the section 20 for the longitudinal adjustment of the leg. The section 21 carries a set screw 23 for securing the sections in their adjusted position, and the legs 18 and 19 have the respective feet or bases 24 and 24' which are hingedly connected to the lower end portions of the sections 21, as at 25, for the swinging movement of the feet around the lower ends of the sections 21 to different positions. The intermediate end leg 19 is provided in addition with a hooked arm or bill 26 projecting from the eye or bearing 22' of the section 20 which is mounted for turning movement on the rod 17, the purpose for which will appear hereinafter. The sections 20 of the legs 19 have eyes or bearings 22 at their upper ends mounted for turning and sliding movement on the rail sections 13.

Legs 27 are provided at the opposite sides for supporting the rails 11 between the ends thereof. These legs 27 are similar in construction with the outer end legs, and each leg 27 includes an upper rod or section 28 having an eye or bearing 29 at its upper end sliably and rotatably engaging the corresponding rail section 15, and a lower tubular member or section 30 slidably receiving the section 28 and carrying a set screw 31 for clamping the sections together. A foot or base 32 is hingedly connected, as at 32', to the lower end portion of the section 30 and can be swung around the lower end of said section to different angular positions.

The bed spring fabric includes transverse or cross chains 33 having coiled elastic springs 34 at their ends provided with hooks 35 to engage the rails 11. Longitudinal chains 36 extend across and interengage with the cross chains 33, and have coiled elastic springs 37 at their innner ends engaging the rod 7. The chains 36 have coiled elastic springs 38 at their outer ends engaging a supplementary transverse end rod 39. Coiled elastic springs 40 are connected to the rod 39 and have hooks 41 to engage the end rod 17 of the bed frame, and the chains 36 can thus remain connected at their outer ends with the rod 39, while the rod 39, through the medium of the springs 40 and hooks 41, can be readily connected to and disconnected from the end rod 17 of the frame. In this way, by disconnecting the hooks 41 from the rod 17 and the hooks 35 from the rails 11, the chains 36 and 33 can be folded or collapsed within a small space, together with the rod 39.

By the provision of the hooked arm or bill 26 on the leg 19, such leg will serve as a lever for convenience in connecting the rod 39 with the rod 17. Thus, as shown in dotted lines in Fig. 3, the leg 19 can be swung to engage the arm 26 behind the rod 39, and by swinging the leg 19 as a lever, the rod 39 can be pulled toward the rod 17 and held, while the hooks 41 are conveniently engaged with the rod 17. The leg 19 can then be swung down and adjusted to rest on the ground or surface underneath to assist in supporting the outer end of the frame.

In order to house the chains 33 and 36 which form a spring net, an elongated box 42 is provided, the same being shown as seated on the running board 9 between the clamps 8, and the ends 43 of the box have apertures 44 through which the rod 7 extends, with said rod located at the lower rear corner of the box where the inner ends of the chains 36 are anchored. The box has a top 45 hinged, as at 46, to the back 47, to swing upwardly, and the front wall 48 is hinged as at 49, to the top 45, whereby the top and front of the box can be opened, for conveniently placing the chains 36 and 33 when folded together or collapsed, together with the rod 39, within the box. The box may also be large enough for holding the mattress and bed clothing, and when the chains 33 and 36 and other parts to be stored away are placed within the box, the top 45 and front wall 48 can be swung down into position, as seen in Fig. 5.

The bed frame and legs are foldable and adjustable to provide a luggage carrier, in order that the device is useful for another purpose, when it is not being used as a bed. In this way, the device serves as a luggage carrier while travelling, and as a bed when camping out. In folding the structure, the hooks 41 are disengaged from the end rod 17 and the hooks 35 disengaged from the rails 11, and the chains 33 and 36 of the bed spring fabric or net are then folded up and placed within the box 42. The sections of the rails are then telescoped together, the sections 14 moving into the sections 12 over the running board 9, and the sections 13 and 15 also moving together. The sections 13 and 15 are then swung upwardly to upright position, as seen in Fig. 5. The legs 18 are swung away from the leg 19, so as to project longitudinally forward and rearward, as seen in Fig. 4. The feet 24 of the legs 18 can be swung and positioned, as seen in Fig. 4, to bear on the plates 50 secured on the wheel fenders 52, and said feet are secured on said plates by means of clamping screws 51 or the like. In this manner, when the outer portion of the bed frame is swung upwardly, the legs 18 in being adjusted and fastened to the plates 50 will form braces for holding the folded bed frame in place and said legs or braces will also form a part of the luggage carrier, extending beyond the rod 17 which forms the upper member of the luggage carrier. The intermediate end leg 19 is adjusted and its foot 24' swung and positioned to extend across the outer edge of the running board 9, and said foot 24' has an angularly extending lug 53 at one end to extend under the outer edge portion or flange of the running board, and a screw 54 extends through the lug 53 to engage upwardly behind the outer edge or flange of the running board for securing the lower end or foot of the leg 19 to the running board. The leg 19 is thus disposed upright between and parallel with the sections 13 and 15 of the bed frame to form the uprights of the luggage carrier. The legs 27 are shifted to a position between the rod 17 and running board and are swung toward the leg 19 and adjusted to bring the feet 32 in overlapping relation across the leg 19 at the opposite sides, as seen in Fig. 6. A screw 23' can then be engaged through the feet 32 and leg 19, for clamping the parts together. The legs 27 are thus secured to the leg 19, and the legs 27 constitute a longitudinal member of the luggage carrier below the rod 17. It will be noted that the sections 20 and 28 of the legs are pivotally and slidably engaged with the corresponding parts of the bed frame, so that said legs can be swung to different positions in using the device as a luggage carrier and bed, and the sections 21 and 30 of the legs can also be slid and turned on the respective sections 20 and 28 for positioning the feet of the legs, which feet can also be swung around the ends of the legs to different positions as needed. If necessary or desired, screws 55 can be engaged with the rail sections 13 for supporting the legs 27 and screws 56 can also be engaged with said rail sections 13 for supporting the legs 18, when the device is formed into the luggage carrier. The device is thus not only compactly folded when not in use as a bed, but also provides a convenient luggage carrier of large capacity.

To unfold the device for use as a bed, the feet 24 of the legs 18 are detached from the plates 50, the foot 24' of the leg 19 detached from the running board and the feet 32 of the legs 27 detached from the leg 19. The sections 13 of the rails are then swung outwardly and downwardly and the rails extended and the sections thereof clamped in position by set screws 15' carried by the sections 12 and 13. The hooks 35 of the chains 33 are then hooked over the rails 11 when the chains are removed from the box 42. The legs 18, 19 and 27 are then adjusted and positioned to support said frame on the ground and the feet of the legs can be turned and swung to different positions to bear on uneven ground. The chains 36 are then stretched, the leg 19 being used as a lever for pulling the rod 39 outwardly toward the rod 17, for conveniently engaging the hooks 41 on said rod 17. The springs 37, 38 and 40 are thus stretched, and the springs 34 connected to the side rails, in order that the bed spring fabric thus provided will be resilient and flexible. The leg 19, after being used for moving the rod 39 outwardly, is returned down to supporting position on the ground. The top 45 and front wall 48 of the box 42 can be folded together and swung to an inclined position within the box, as seen in dotted lines in Fig. 2, if desired, for the pillows and to serve as a head support.

Having thus described the invention, what is claimed as new is:—

1. A foldable bed comprising a foldable frame, a bed fabric having means for detachable connection with the frame when the frame is unfolded, and means for connecting one end of the frame and one end of the fabric on the running board of a vehicle or other support, said fabric being foldable by itself when disconnected from the frame to be placed out of the way on the running board or support, and the frame being foldable, when the fabric is disconnected therefrom, to form a luggage carrier above said running board or support.

2. A foldable bed comprising a box to be mounted on a running board of a vehicle or other support, a foldable frame, a bed fabric, and means for securing one end of the fabric and one end of the frame on said running board or support, said fabric having means to detachably engage the frame when the frame is unfolded and the fabric being foldable in said box when detached from the frame, said frame being foldable on the outside of the box to form a luggage carrier.

3. A foldable bed comprising a box to be mounted on a running board of a vehicle or other support, a foldable frame, a bed fabric, and means for securing one end of the fabric and one end of the frame on said running board or support, with the end of the fabric within said box, said fabric having means to detachably engage the frame when the frame is unfolded and the fabric being foldable when detached from the frame, to be disposed in said box, said frame being foldable on the outside of the box to form a luggage carrier on said running board or support.

4. A foldable bed including a box to be mounted on a running board of a vehicle or other support, a foldable bed frame having an end rod extending through said box, said frame being foldable on the outside of the box to form a luggage carrier on said running board or support, and a bed fabric connected to said rod and having means for detachable connection with the frame when the frame is unfolded, said fabric, when detached from the frame, being foldable independently thereof to be placed in said box.

5. A foldable bed comprising a frame having foldable rails, means for connecting one end of the frame to a running board of a vehicle or other support, the rails being foldable so that the frame forms a luggage carrier on the running board or support, and a bed fabric having means along its edges and one end for engaging the rails and one end of the frame detachably, whereby the fabric can be disconnected from said rails and end of the frame to be folded independently of the frame.

6. A foldable bed comprising a frame having foldable rails, means for mounting one end of the frame on a running board of a vehicle or other support, the rails of the frame being foldable so that the frame forms a luggage carrier on the running board or support, a bed fabric connected at one end to said, end of the frame and having means along its edges to detachably engage the rails, a rod connected to the other end of the fabric and detachably connected to the other end of the frame for stretching the fabric when the frame is unfolded, the fabric being foldable with said rod, when the fabric and rod are detached from the frame, independently of the frame.

7. A foldable bed comprising a foldable frame, a bed fabric foldable independently of the frame, and having means for detachable connection with one end of the frame, and a leg for supporting such end of the frame, said leg being formed as a lever for engagement with the fabric for pulling the fabric toward said end of the frame for connection thereto.

8. A foldable bed comprising a foldable frame, a bed fabric foldable independently of the frame and having means for detachable connection with one end of the frame, and a leg mounted for swinging movement on said end of the frame for supporting the frame and having a portion engageable with the fabric so that the leg can be used as a lever for pulling the fabric toward said end of the frame for connection thereto.

9. A foldable bed comprising a foldable frame for connection with the running board of a vehicle or other support, and legs connected to the frame for supporting it when unfolded, the frame being foldable to form a luggage carrier over said running board or support, and some of the legs being attachable to the vehicle or other structure to provide braces for supporting the frame in folded position and to form portions of the luggage carrier.

10. A foldable bed comprising a foldable frame for attachment to the running board of a vehicle or other support, the frame being foldable adjacent to the vehicle or other structure to form a luggage carrier over the running board or support, and legs connected to the frame to support it when unfolded, some of the legs being adapted to be moved within the frame, when the frame is folded, and having means for fastening them in place, to provide a filler for the folded frame forming a part of the luggage carrier.

11. A foldable bed comprising a foldable frame for attachment to the running board of a vehicle or other support, the frame being foldable adjacent to the vehicle or other structure to form a luggage carrier over the running board or support, and legs connected to the frame to support it when unfolded, some of the legs being adapted to be moved within the frame, when the frame is folded, and having means for fastening them in place, to provide a filler for the folded frame forming a part of the luggage carrier, and other legs being adapted to be secured to the vehicle or structure to form braces for holding the folded frame in place and to form portions of the luggage carrier.

12. A foldable bed comprising a frame having foldable rails and adapted to be attached at one end to a running board of a vehicle or other support, the frame being foldable to form a luggage carrier above the running board or support, and legs swingably engaging said rails to support them when the frame is unfolded and to be attached to the vehicle or other structure, when the frame is folded, to hold the frame in place.

13. A foldable bed comprising a foldable frame to be connected at one end to a running board of a vehicle or other support, the frame being foldable to form a luggage carrier on said running board or support, and a leg connected to that end of the frame opposite to the running board or support and having means for attachment to the running board or support when the frame is folded.

14. A foldable bed comprising a frame to be connected at one end with a running board of a vehicle or other support and having foldable rails for the folding of the frame to form a luggage carrier above the running board or support, a leg connected to the end of the frame opposite to the running board or support for supporting said end of the frame and having means for attachment to the running board or support when the frame is folded, and legs connected to the rails for supporting the frame when unfolded and having means for attachment to the aforesaid leg when the frame is folded.

In testimony whereof I have signed my name to this specification in the presence of two subscribing witnesses.

MARY A. FULLER.

Witnesses:
A. J. ARMSTRONG,
M. KLINGLER.